United States Patent
Thomas et al.

[19]

[11] Patent Number: 6,016,045
[45] Date of Patent: Jan. 18, 2000

[54] REAL-TIME CLOCK BACK-UP BATTERY

[75] Inventors: Mark G. Thomas; Ronald B. Lannan; Kenneth R. Federle, all of Columbus, Ind.

[73] Assignee: Cummins Engine Company, Inc., Columbus, Ind.

[21] Appl. No.: 09/243,644

[22] Filed: Feb. 3, 1999

[51] Int. Cl.[7] .............................. H02J 7/00; B60R 16/04; B60L 1/00
[52] U.S. Cl. ................................... 320/107; 320/DIG. 26; 180/68.5; 307/9.1; 307/66
[58] Field of Search ............................ 320/107, DIG. 26; 180/68.5; 307/9.1, 66

[56] References Cited

U.S. PATENT DOCUMENTS

| | | |
|---|---|---|
| 4,672,228 | 6/1987 | Swoboda . |
| 4,925,750 | 5/1990 | Theiss . |
| 5,077,572 | 12/1991 | Morisawa . |
| 5,191,500 | 3/1993 | Hatano et al. . |
| 5,204,610 | 4/1993 | Pierson et al. . |
| 5,358,798 | 10/1994 | Kleinert, III et al. . |
| 5,529,142 | 6/1996 | Burke, III . |
| 5,569,997 | 10/1996 | Berger . |

*Primary Examiner*—Peter S. Wong
*Assistant Examiner*—Gregory J. Toatley
*Attorney, Agent, or Firm*—Baker & Daniels

[57] ABSTRACT

A back-up battery system is provided for use with a real-time clock of an on-board device controller. In its normal operation, the real-time clock (RTC) is powered by a primary power source, such as a vehicle battery. When the primary source is interrupted, the back-up battery system is invoked to provide back-up power to the RTC. The system includes a low voltage dry cell battery mounted within a fuse component configured for electrical engagement within the vehicle fuse block. In one embodiment, a relay is interposed between the fuse component and the RTC to make and break the back-up power circuit in response to the state of the primary power source. In another embodiment, the battery within the fuse component is replaceable, with the fuse component including a base and a removable cap. In still another embodiment, the battery within the fuse component is a rechargeable battery, and the back-up power system includes a recharging circuit operable with the primary power source.

31 Claims, 3 Drawing Sheets

REAL-TIME CLOCK BACK-UP BATTERY

BACKGROUND OF THE INVENTION

The present invention concerns a back-up power system for a real-time clock. More particularly, the invention concerns a back-up battery system for providing secondary power to the real-time clock of an on-board device controller, such as an engine control module for a vehicle.

The microprocessor has found widespread application in the automotive industry. In one application, an engine control module provides software-based control of the operation of a vehicle engine. In addition, the engine control module (ECM) continuously monitors engine performance. For instance, a plurality of condition sensors are disposed at various components of the engine. These sensors are periodically polled by the ECM and the resulting output signals are stored as data in ECM memory for subsequent analysis. This data can be downloaded by an engine technician using an external tool.

In order to provide more comprehensive diagnostics of engine activity and performance, many ECMs include a capability for logging performance data as a function of actual time. For example, some ECMs log the times at which an engine is started, idled, restarted, or stopped. An addition, time and date stamps can be applied to engine fault data. Still other ECM's keep track of maintenance hours, namely the elapsed time between oil, coolant and filter changes.

In order to provide this actual time information, the typical ECM includes an on-board real-time clock. The real-time clock runs continuously and maintains accurate date and time information. In a typical engine controller installation, the real-time clock is provided as a hardware peripheral, such as the Motorola MC68HC68TI. This peripheral chip outputs real time as a binary coded decimal signal in the format of year/month/day/hour/minute/second/millisecond. This BCD value is then used by the on-board ECM to compute other time-related values.

The real-time clock (RTC) is continuously powered even when the vehicle engine has been shutdown or the keyswitch has been turned to the OFF position. In a typical application, the ECM includes a power supply transformer that is directly connected to the on-board vehicle battery. This transformer can provide power to various essential components of the vehicle electrical and control system, such as elements of the ECM, certain sensors, and the real-time clock.

In the event that power from the primary on-board vehicle battery is lost, most RTC chips can recognize the condition and set a flag. This flag can be subsequently read by the ECM, which itself sets a flag indicating that the real-time clock information is no longer accurate. Some engine control modules will continue to calculate time-related information based upon the output of the RTC when normal power is restored. When data is subsequently downloaded from the ECM, the technician can then evaluate the time and date stamped information in light of the power loss flag set by the ECM. This tagged information can be subsequently reconstructed by the technician, although the reconstruction techniques are subject to certain inaccuracies. In one typical ECM, the latest real-time value is stored in non-volatile memory when the ECM is shut down. However, when power is abruptly lost, many ECM's do not have a mechanism for recording the last known real time.

There is therefore a need for a back-up power supply that is operable in the event of a failure of the primary power source. Preferably, the back-up power supply is capable of replacement or regeneration so that the back-up power is always available on demand.

SUMMARY OF THE INVENTION

In view of these unfulfilled needs, the present invention contemplates a back-up power system for a real-time clock used by an on-board electronic controller or microprocessor. In one feature of the invention, the back-up power system utilizes a small voltage battery having sufficient voltage to maintain the real-time clock in the event of a failure of the primary power supply. This battery forms part of a fuse element that is integrated into the electrical system through a fuse block. The fuse element includes prongs or conductive channels configured to mate with corresponding female or male connectors in the fuse block. The electrical system includes additional circuitry that connects the fuse block connectors to the real-time clock to provide electrical power.

In a further aspect of the invention, the additional circuitry connects the back-up battery in parallel with the electrical connection between the real-time clock and the primary power source, such as a vehicle battery. A diode can be interposed in the primary and additional circuitry at their junction.

The back-up power system of the present invention contemplates a dry cell type battery, along the lines of a camera or watch battery. In one embodiment, the battery is environmentally encased within the fuse element. The back-up battery can then be replaced by replacing the entire fuse element. In another embodiment, the fuse element is constructed for independent removal and replacement of the back-up battery. In one specific embodiment, the fuse element includes a housing formed of a base that carries conductive members for engaging the fuse block, and a cap that can be snapped onto the base.

In a preferred embodiment of the back-up power system, a switching element is provided to invoke the back-up battery only when the primary power source is interrupted. In one specific embodiment, the switching element is a relay that is makes and breaks the circuit between the back-up battery and the real-time clock based on the condition of the primary power supply.

In a further alternative, the back-up power system can utilize a rechargeable battery. The system can include a recharging circuit that recharges the back-up battery on demand or, most preferably, when the primary power supply is operating. In the latter case, the recharging circuit can be integrated with the switching element. In a preferred embodiment, the switching element is a relay that has a first position when the primary power supply is active in which the recharging circuit is connected to the primary electrical system, and a second position in which the recharging circuit is disengaged and the back-up battery is connected to the real-time clock.

It is one object of the invention to provide a back-up power system for providing electrical power to a real-time clock when the primary power source is interrupted. A further object is achieved by features of the invention that permit ready replacement of the back-up power source.

A further object is to provide a back-up power system that can utilize a small battery sufficient to power the real-time clock, or similar low-voltage peripheral device. One benefit of the invention is that it can accommodate a replaceable or a rechargeable battery within the back-up power system.

Other objects and benefits of the invention will become readily apparent upon consideration of the following written description and accompanying figures.

DESCRIPTION OF THE PREFERRED EMBODIMENTS

Figure 1:
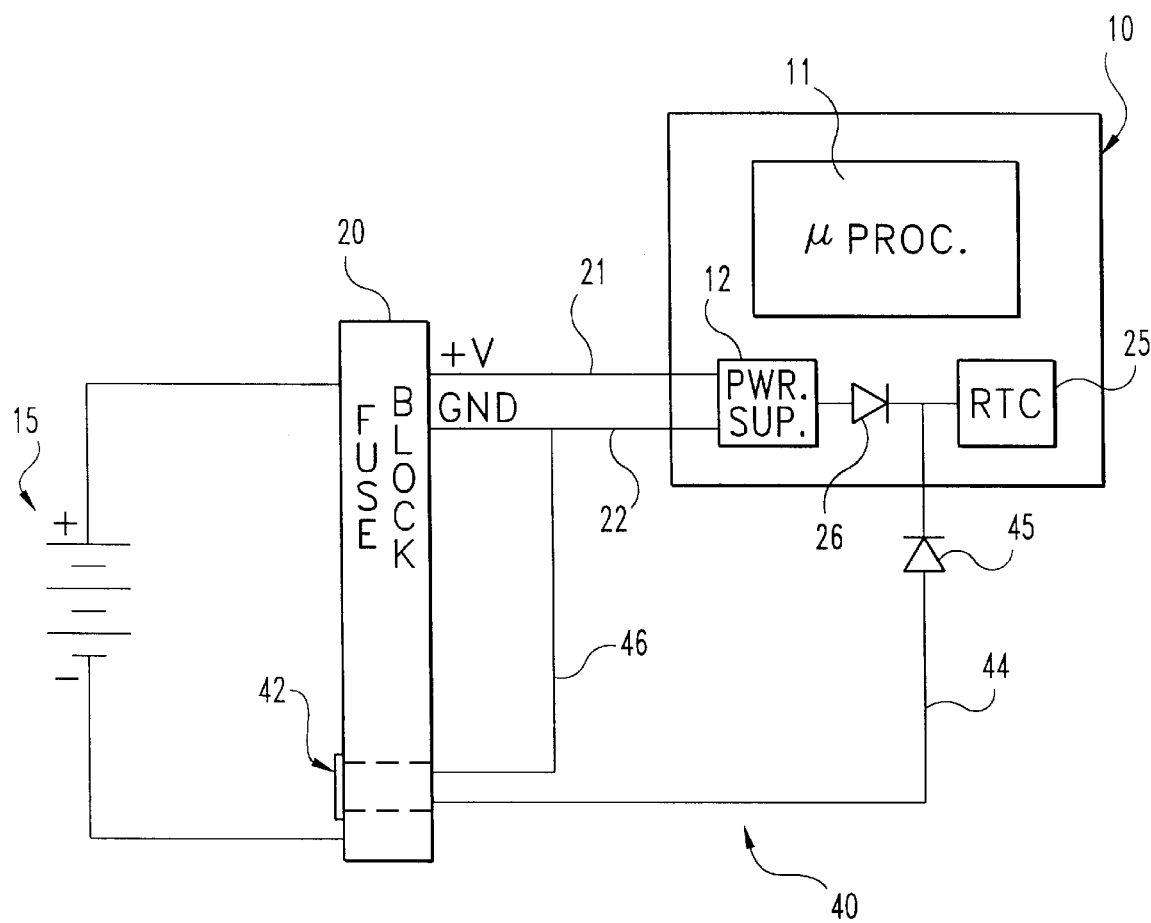
FIG. 1 is an electrical schematic of a portion of a vehicle electrical system incorporating one embodiment of a back-up battery system of the present invention.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

The present invention contemplates a back-up power system for a real-time clock (RTC) used with an on-board controller. In the illustrated embodiment, the controller is an engine control module, although the present invention can be implemented with a wide range of remote controllers that utilize an RTC powered by a primary source. In addition, while the preferred embodiments provide back-up power to a real-time clock, other low-power peripheral components can be similarly serviced by the back-up power system of the present invention.

In accordance with the present invention, a back-up battery system augments the existing primary power supply, which is typically the vehicle battery. In the event of a failure of the vehicle battery, the back-up battery system is invoked to maintain operation of the RTC. In accordance with certain features of the invention, the back-up battery system is incorporated into the existing fuse block of the vehicle electrical system. More particularly, the back-up battery is housed within a fuse casing that can be plugged into the fuse block. This back-up battery "fuse" is electrically connected to the real-time clock in parallel with the primary battery power supply.

In one embodiment of the invention, a back-up battery system is incorporated into an existing vehicle electrical system, as shown in the schematic of FIG. 1. The vehicle can include a control module 10 with an on-board microprocessor 11. In the illustrated embodiment, the control module is an engine control module (ECM) and the microprocessor executes various software commands to govern the operation of components of the engine. In addition, the microprocessor 11 receives data from various vehicle sensors, maintains that data in memory, and makes the information available for subsequent downloading and analysis. The ECM 10 includes its own internal power supply 12, or transformer, as is well known in the art. The power supply 12 is electrically connected to the primary power source 15, which in the illustrated embodiment is a vehicle battery. More specifically, the ECM power supply 12 is connected to the battery through a fuse block 20 by way of positive voltage wire 21 and ground wire 22.

In accordance with the illustrated embodiment, the ECM 10 also includes a real-time clock (RTC) chip 26. Preferably, the real-time clock chip is separate from the microprocessor 11. The RTC 25 is electrically connected to the onboard power supply 12 through a diode 26. In normal operation, the primary battery 15 provides power to the RTC 25 through the ECM power supply 12. In addition, the power supply 12 can also provide electrical power to various other essential components that must be maintained even when the vehicle has been shutdown. The real-time clock 25 maintains accurate time information so long as power from the vehicle battery 15 is not compromised.

However, a vehicle battery and electrical system can fail for a variety of reasons. In that event, power to the RTC 25 is interrupted, which means that the time information generated by the RTC is no longer accurate. In order to address this problem, the present invention contemplates a back-up battery system 40 that is integrated into the vehicle electrical system. In particular, a back-up power source is contained within a fuse component 42 that is plugged into the existing fuse block 20. Power from the fuse component 42 is provided to the real-time clock 25 by way of a back-up power wire 44 as fed through a diode 45. The fuse component 42 is also connected the vehicle electrical system ground wire 22 by way of a ground lead 46.

Figure 2:
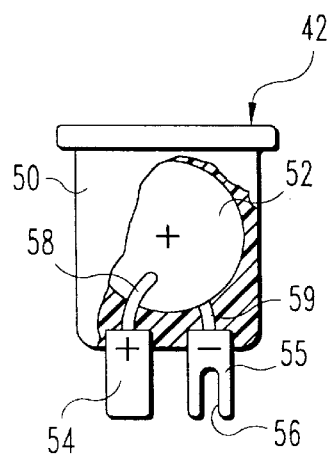
FIG. 2 is a top elevation view of a fuse component used with the back-up battery system depicted in FIG. 1.
Figure 3:
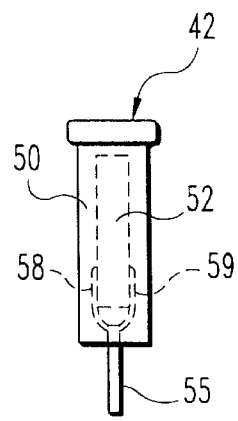
FIG. 3 is a side elevation view of the fuse component shown in FIG. 2.

Details of one embodiment of the fuse component according to the present invention are shown in FIGS. 2 and 3. In particular, the fuse component 42 includes a fuse casing 50 that is sized to be received within a standard fuse block 20. The fuse component 42 in the illustrated embodiment is a male fuse. Housed within the fuse casing 50 is a back-up battery 52. Since the back-up battery 62 is preferably only powering the real-time clock 25, it need not be a high voltage battery. In accordance with a most preferred embodiment of the invention, the back-up battery 52 is a dry cell battery, such as a "camera" or "watch" battery. In a specific embodiment, the back-up battery is selected from a group including nickel, zinc and lithium batteries. Preferably, the back-up battery 52 has a long "shelf life", meaning that it does not lose its charge over a significantly long period of time. Ideally, the back-up battery 52 is used to bring power to the RTC 25 very infrequently. However, in the event that the back-up battery system 40 is invoked, the battery 52 must have a sufficient charge to power the RTC in the emergency situation.

In the illustrated embodiment, the fuse component 52 includes a pair of prongs that are configured for engagement into the standard fuse block 20. In particular, the component includes a +V prong 54 and a ground prong 55. In one specific embodiment, the ground prong 55 includes a polarity notch 56 cut into the prong to insure that the fuse component 42 is mounted within the fuse block in the proper orientation. Other means for ensuring the proper polarity of the connection between the fuse component 42 and the fuse block 20 are contemplated, such means being well known in the electrical and vehicle electrical systems arts. Each of the prongs 54 and 55 is electrically connected to the poles of the battery 52 by a corresponding positive lead 58 and a negative lead 59. The leads 58, 59 can be directly attached to the battery, such as by soldering. Alternatively, the leads can be in the form of leaf spring contacts that clamp about the battery.

In the illustrated embodiment, the fuse component 42 is an integrally formed unit. Preferably, the fuse casing 50 is formed of a moldable plastic. The casing can then be formed entirely around the back-up battery 52, the positive and negative leads 58, 59 and the upper portions of the voltage and ground prongs 54 and 55. Also preferably, the fuse casing material is adequate to maintain the environmental soundness of the fuse component 42. Specifically, the casing material can prevents leakage of the encased back-up battery 52, as well as protect the battery from external electrical impulses or EMF that might disrupt the voltage performance of the battery.

The voltage of the back-up battery 52 can be determined by the voltage requirements of the real-time clock 25. In one specific embodiment, the back-up battery 52 is a 1.5-volt lithium battery. The fuse features of the present inventions facilitates testing and, if necessary, replacement of the back-up battery. Specifically, the fuse component 42 can be removed from the fuse block 20 and plugged into a separate test fixture. The test fixture can read the output voltage of the back-up battery to determine its health and remaining life. Preferably, the fuse component 42 has a scheduled replacement period based upon a nominal life for the back-up battery. For instance, the fuse component 42 of the back-up battery system 40 can be replaced every two years to insure that the back-up battery is substantially at full strength when needed.

Figure 4:
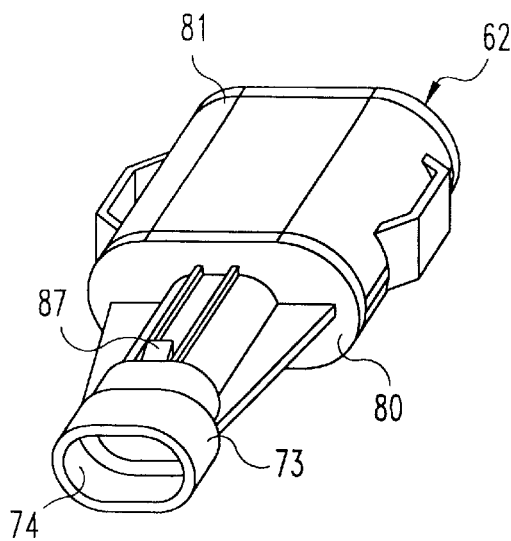
FIG. 4 is a top prospective view of an alternative embodiment of a fuse component for use in the back-up battery system shown in FIG. 1.
Figure 5:
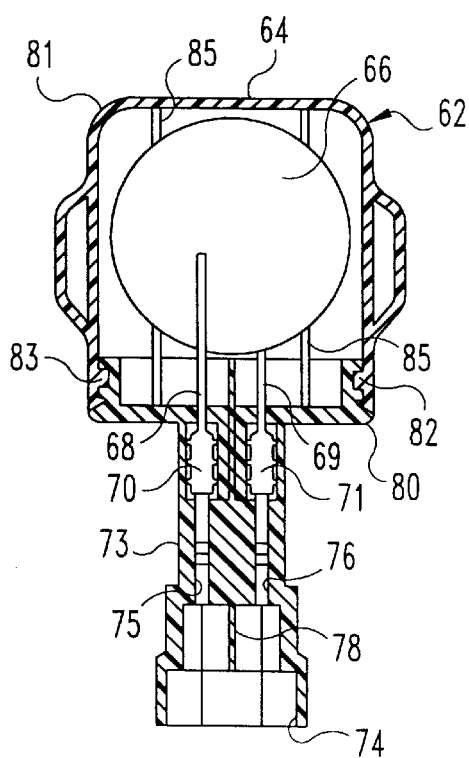
FIG. 5 is a top cross-sectional view of the fuse component shown in FIG. 4.
Figure 6:
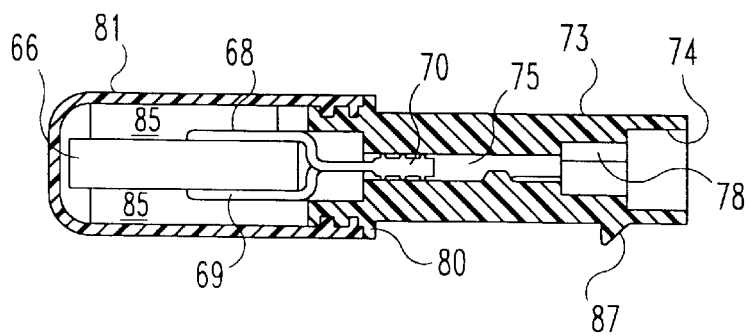
FIG. 6 is a side cross-sectional view of the fuse component shown in FIG. 4.

An alternative embodiment of a fuse component for use in the back-up battery system 40 is shown in FIGS. 4–6. Specifically, the fuse component 62 includes a fuse casing 64 that houses the back-up battery 66. In one feature of this embodiment, the fuse component 62 includes a female housing 73 terminating in a female plug end 74. Thus, this embodiment is configured to engage male components of a known fuse block configuration. As with the fuse component 42, the component 62 retains the removability and replaceability features.

The fuse component 62 also includes positive and negative leads 68 and 69 that extend from the appropriate poles of the battery 66 to engage a corresponding positive prong 70 and negative prong 71. In the illustrated embodiment, the leads 68 and 69 can be substantially permanently attached, such as by soldering, to the battery 66 so that the battery, leads and prongs form a one-piece replaceable unit. Alternatively, the battery and leads can be molded within a separate case that can be positioned within the fuse casing 64.

In the illustrated embodiment, the positive prong 70 and negative prong 71 are configured to be pushed into a corresponding positive contact channel 75 and negative contact channel 76. The contact channels 75, 76 are formed of an electrically conductive material to provide electrical connection between the prongs 70, 71 and male prongs within the vehicle fuse block 20. In the illustrated embodiment, the female housing 73 defines a polarity key 78 to ensure proper orientation of the fuse component 62 within the fuse block 20.

One important feature of the fuse component embodiment shown in FIGS. 4–6 is that the battery 66 is removable. Thus, the fuse casing 64 includes a casing base 80 that is preferably integral with the female housing 73, and a separate cap 81. The cap 81 is substantially hollow to receive the battery 66 therein. The base 80 and cap 81 are configured for releasable engagement so that the cap 81 can be removed from the base to permit replacement of the battery 66. The one specific embodiment, a snap fit grove 82 is formed around the outer perimeter of the base 80, while a snap fit ridge 83 is formed at the inner perimeter of the cap 81. In this way, the cap can be readily snap fit over the base to environmentally seal the battery 66 within the fuse casing 64.

In specific embodiment, the cap 81 includes a set of support flanges 85 that project inwardly from the cap. These flanges support the battery 66 within the cap 81. Furthermore, the female housing 73 can define a retaining tab 87 that is configured to lock the fuse component 62 within the vehicle fuse block 20.

With this embodiment, the battery 66 can be removed by first disengaging the cap 81 from the base 80 of the fuse casing 64. The prongs 70 and 71 can be disengaged from the corresponding contact channel 75 and 76 by pulling the battery and prongs outward. A new battery can be installed by inserting its prongs 70, 71 into the contact channels 75, 76, and replacing the cap 81 over the battery 66. With this embodiment, rather than replacing the entire fuse, only the battery need be replaced.

In the illustrated embodiment, the leads 68, 69 and integral prongs 70, 71 are described as being attached to the battery 66. Alternatively, the leads 68, 69 and prongs 70, 71 can be integrally formed within the fuse casing 74. For instance, the prongs can constitute an extension of the contact channels in the base 80 of the casing. The leads 68, 69 can have a leaf spring configuration to receive and maintain continuous electrical contact with the battery 66.

In the embodiment of the back-up battery system 40 shown in FIG. 1, the fuse component 42 is depicted as being directly connected to the real-time clock 25. Most preferably, the back-up battery system is only invoked when power from the primary battery 15 is interrupted. Thus, in an alternative embodiment of the electrical system shown in FIG. 7, a back-up battery system 90 includes a switch element 91. This switch element 91 is operable to electrically connect the back-up battery 66 of the fuse component 62 to the RTC 25 only when power from the power supply 12 is interrupted.

In one embodiment, the switch element 91 is a single throw, double make, neutral closed relay switch, in which the positive voltage wire 92 exiting the fuse component 62 forms one switch contact for the relay. A second switch contact is integrated to the positive voltage output wire 93 which is directly connected to the real-time clock 25 through the diode 45. The relay 91 includes a conductor 94 that is actuated by a relay armature 95. Preferably, the armature 95 is connected to the output of the power supply 12.

In its neutral position, the armature is oriented so that the conductor 94 makes the connection between the two switch contacts defined by the wires 92 and 93. When electricity is flowing from the power supply 12, the armature 95 moves the conductor 94 to break contact with voltage lead wire 92 and voltage output wire 93. In this manner, the electrical circuit is broken between the back-up battery and the RTC 25. When power is interrupted from the power supply 12, the armature 95 is deactivated, and the relay conductor 94 returns to its neutral position completing the circuit between the voltage wires 92 and 93.

In the illustrated embodiment, a single pole, double throw, neutral closed relay is depicted. Other relays and switch elements are contemplated that can make and break the electrical connection between the back-up battery fuse component 62 and the RTC 25 depending upon whether primary power is being supplied to the real-time clock. In the illustrated embodiment, the relay 91 operates in response to the output of the power supply 12. Alternatively, the relay 91 can be connected to the positive voltage wire 21, or to some other output from the fuse block 20.

In the preferred embodiments, the batteries 52 and 66 are described as being replaced when their output voltage has substantially diminished. Alternatively, the batteries can be rechargeable. Although even rechargeable batteries must be replaced, their shelf life can be significantly longer. Moreover, since the batteries can be recharged they will always have their maximum voltage capability when called upon in an emergency.

Figure 7:
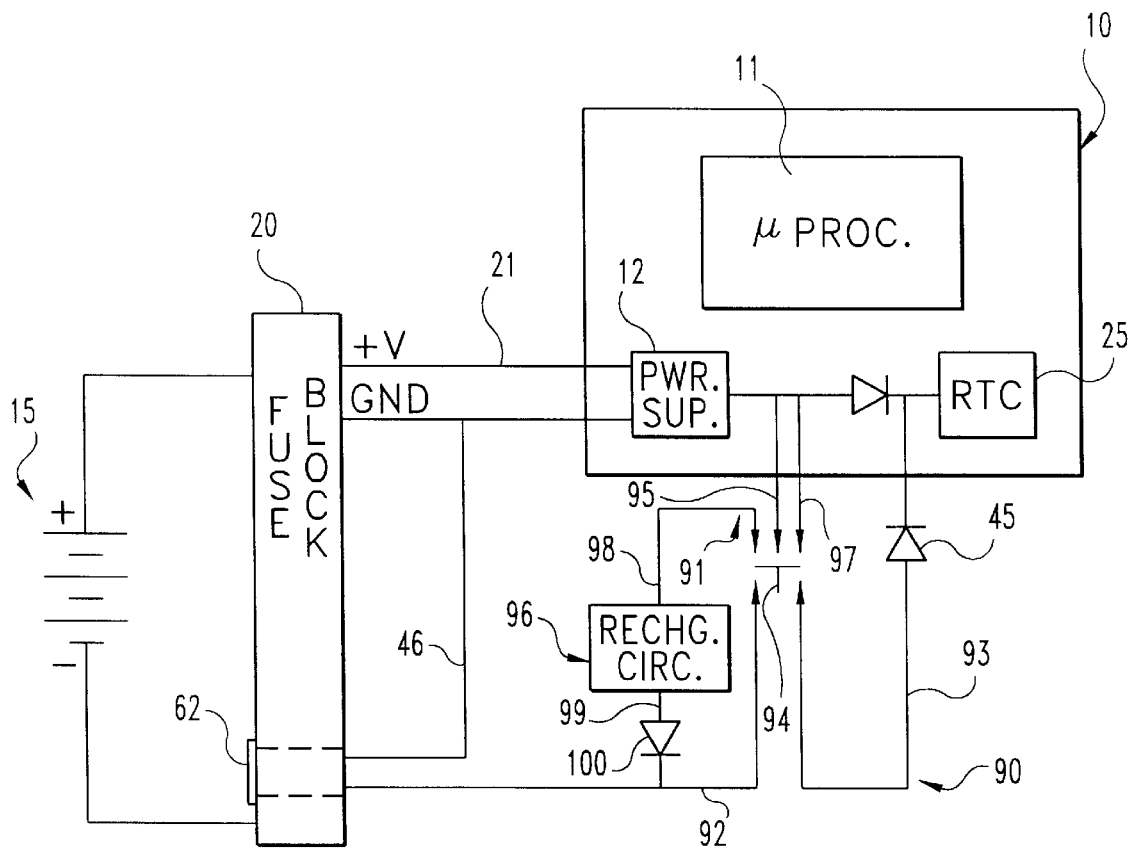
FIG. 7 is a circuit diagram of a portion of a vehicle electrical circuit including a further embodiment of the back-up battery system according to the present invention.

A variety of recharging circuits can be provided for recharging the battery within the fuse components 42 or 62. For example, the recharging circuit can be selectively invoked by the vehicle operator. However, in a preferred embodiment, the recharging circuit is integrated into the back-up battery system 90. Thus, as shown in FIG. 7, a recharging circuit 96 is included. The recharging circuit 96 includes a voltage lead 98 that is incorporated into the relay switch 91. A voltage-input wire 97 is connected between the output of the power supply 12 and the relay switch 91. In this embodiment, the relay switch 91 can be the single throw relay described above, modified to provide double make, double break capabilities. Thus, when power is being provided through the power supply 12, the conductor 94 is connected between the voltage input 97 and voltage lead 98, while the back-up power circuit is broken. On a primary power failure, the relay 91 assumes its neutral position, making the back-up power circuit and breaking the recharging circuit.

When power is provided through the power supply 12, electricity flows through the recharging circuit 96, to the output wire 99, through the diode 100, and back to the rechargeable battery through the positive voltage lead wire 92. The recharging circuit can be of known design for the particular battery 52 or 66. The recharging circuit 96 can have a cut-off voltage to avoid overcharging the battery.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

For example, while the illustrated embodiment of the back-up power circuit is used with a real-time clock, the circuit can be used to power other essential low-voltage electrical components. The low-voltage aspect of the back-up battery is generally dictated by small battery technology. Other batteries can be implemented with the present invention as technology improvements increase the voltage of small package batteries.

What is claimed is:

1. A battery back-up system for a real-time clock in a vehicle controller, in which power is normally provided to the real-time clock through a primary power circuit connected to the vehicle battery through a vehicle fuse block, the system comprising:

a fuse component having at least two conductive prongs configured for removable electrical engagement with a corresponding number of electrical contacts within the vehicle fuse block;

a back-up battery mounted within said fuse component in electrical connection with said conductive prongs; and a back-up power circuit electrically connecting said corresponding number of electrical contacts within the fuse block to the real-time clock to provide power from the back-up battery to the clock.

2. The battery back-up system according to claim 1, wherein said fuse component includes means for removably mounting said back-up battery therein.

3. The battery back-up system according to claim 2, wherein said means for removably mounting includes a base supporting said conductive prongs and a cap releasably connected to said base, said cap defining a space for receiving said back-up battery therein.

4. The battery back-up system according to claim 3, wherein said base and said cap include means for snap fit engagement therebetween.

5. The battery back-up system according to claim 1, wherein said back-up power circuit is in parallel with the primary power circuit.

6. The battery back-up system according to claim 1, wherein said back-up power circuit includes a switch for connecting said circuit to and disconnecting said circuit from the real-time clock.

7. The battery back-up system according to claim 6, wherein said switch has a first state when the vehicle battery is providing power to the real-time clock in which said back-up power circuit is electrically disconnected from the real-time clock, and a second state when the vehicle battery is not providing power in which said back-up power circuit is electrically connected to the real-time clock.

8. The battery back-up system according to claim 6, wherein said switch is a relay having an armature connected to the primary power circuit.

9. The battery back-up system according to claim 1, wherein said back-up battery is a dry cell battery.

10. The battery back-up system according to claim 9, wherein said back-up battery is selected from the group including nickel, zinc and lithium batteries.

11. The battery back-up system according to claim 1, wherein:

said back-up battery is rechargeable; and the system includes a recharging circuit connected between said corresponding number of electrical contacts within the vehicle fuse block and the vehicle battery.

12. The battery back-up system according to claim 11, wherein said back-up power circuit includes a switch for making and breaking the electrical connection between the primary battery and said recharging circuit.

13. The battery back-up system according to claim 12, wherein said switch has a first state when the vehicle battery is providing power to the real-time clock in which said recharging circuit is electrically connected to the vehicle battery, and a second state when the vehicle battery is not providing power in which said recharging circuit is electrically disconnected from the vehicle battery.

14. The battery back-up system according to claim 1, in which the real-time clock requires a predetermined voltage for operation, wherein said back-up battery has a voltage that is substantially equal to said predetermined voltage.

15. The battery back-up system according to claim 1, wherein:

two of said prongs have opposite polarities;

two of said corresponding contacts within the fuse block have like opposite polarities; and said fuse component includes key means for ensuring electrical engagement only between said prongs and said contacts having like polarity.

16. A system for monitoring operating conditions in a vehicle having a vehicle battery and a fuse block connected to the battery to distribute power to electrical components of the vehicle, the system comprising:

an electronic module operable to monitor operating conditions of the vehicle, said module having internal power supply circuitry connected to the vehicle battery through the fuse block;

a real-time clock external to said electronic module for providing clock data to said electronic module, said real-time clock being electrically connected to said internal power supply circuitry of said module;

a back-up power system for said real-time clock, said system including:
  a fuse component having a pair of conductive prongs configured for removable electrical engagement with a corresponding pair of electrical contacts within the vehicle fuse block;
  a back-up battery mounted within said fuse component in electrical connection with said conductive prongs; and
  a back-up power circuit connected between said pair of electrical contacts and said real-time clock.

17. The battery back-up system according to claim 16, wherein said fuse component includes means for removably mounting said back-up battery therein.

18. The battery back-up system according to claim 16, wherein said back-up power circuit is in parallel with the primary power circuit.

19. The battery back-up system according to claim 16, wherein said back-up power circuit includes a switch for connecting said circuit to and disconnecting said circuit from the real-time clock.

20. The battery back-up system according to claim 19, wherein said switch has a first state when the vehicle battery is providing power to the real-time clock in which said back-up power circuit is electrically disconnected from the real-time clock, and a second state when the vehicle battery is not providing power in which said back-up power circuit is electrically connected to the real-time clock.

21. The battery back-up system according to claim 16, wherein said back-up battery is a dry cell battery.

22. The battery back-up system according to claim 16, wherein:
said back-up battery is rechargeable; and
the system includes a recharging circuit connected between said corresponding number of electrical contacts within the vehicle fuse block and the vehicle battery.

23. The battery back-up system according to claim 22, wherein said back-up power system includes a switch for making and breaking the electrical connection between the vehicle battery and the recharging circuit in response to the state of the vehicle battery.

24. The battery back-up system according to claim 16, in which the real-time clock requires a predetermined voltage for operation, wherein said back-up battery has a voltage that is substantially equal to said predetermined voltage.

25. A back-up power device for a real-time clock in a vehicle controller, in which power is normally provided to the real-time clock through a primary power circuit connected to the vehicle battery through a vehicle fuse block, the device comprising:

a fuse casing configured for mounting within the vehicle fuse block;

a battery mounted within said fuse casing; and at least two conductive prongs electrically connected to said battery and supported by said fuse casing for electrical connection with a corresponding number of electrical contacts within the vehicle fuse block.

26. The back-up power device according to claim 25, wherein said fuse casing includes:
  a base supporting said at least two conductive prongs; and
  a cap removably mounted on said base, said cap defining a space to receive said battery therein.

27. The back-up power device according to claim 26, wherein said base and said cap define means for snap fit engagement therebetween.

28. The back-up power device according to claim 25, wherein said battery is a dry cell battery.

29. The back-up power device according to claim 28, wherein said battery is selected from the group including nickel, zinc and lithium batteries.

30. The back-up power device according to claim 28, wherein said battery is a rechargeable battery.

31. The back-up power device according to claim 25, wherein said battery is embedded within said fuse casing.

* * * * *